US010516322B2

(12) United States Patent
Pietromonaco

(10) Patent No.: US 10,516,322 B2
(45) Date of Patent: Dec. 24, 2019

(54) METHOD AND APPARATUS FOR MAINTENANCE OF ELECTRIC MOTOR

(71) Applicant: ARM Ltd., Cambridge (GB)

(72) Inventor: David Victor Pietromonaco, Cupertino, CA (US)

(73) Assignee: ARM Ltd., Cambridge (GB)

( * ) Notice: Subject to any disclaimer, the term of this patent is extended or adjusted under 35 U.S.C. 154(b) by 243 days.

(21) Appl. No.: 15/159,157

(22) Filed: May 19, 2016

(65) Prior Publication Data
US 2017/0338723 A1  Nov. 23, 2017

(51) Int. Cl.
| | |
|---|---|
| H02K 1/08 | (2006.01) |
| H02K 1/14 | (2006.01) |
| H02K 1/18 | (2006.01) |
| H02K 3/28 | (2006.01) |
| H02K 3/52 | (2006.01) |
| H02K 11/30 | (2016.01) |
| H02K 15/00 | (2006.01) |
| H02K 15/02 | (2006.01) |
| H02K 19/06 | (2006.01) |
| H02P 25/18 | (2006.01) |

(52) U.S. Cl.
CPC .......... *H02K 15/0006* (2013.01); *H02K 1/08* (2013.01); *H02K 1/148* (2013.01); *H02K 3/521* (2013.01); *H02K 15/022* (2013.01); *H02P 25/18* (2013.01); *H02K 1/185* (2013.01); *H02K 3/28* (2013.01); *H02K 11/30* (2016.01); *H02K 19/06* (2013.01); *H02K 2203/12* (2013.01); *H02K 2213/12* (2013.01); *Y02E 10/725* (2013.01)

(58) Field of Classification Search
CPC .......... H02K 1/08; H02K 15/00; H02K 15/02; H02K 15/0006; H02K 1/148; H02K 15/022; H02K 3/521; H02K 1/185; H02K 19/06; H02K 11/30; H02K 2203/12; H02K 2213/12; H02K 3/28; H02P 25/18
USPC .................. 310/68 R, 216.088, 216.098, 269
See application file for complete search history.

(56) References Cited

U.S. PATENT DOCUMENTS 5,223,761 A * 6/1993 Larsen .................. H02K 1/148
                                                        310/185
5,689,164 A * 11/1997 Hoft .................... H02P 25/0925
                                                        318/400.17

(Continued)

FOREIGN PATENT DOCUMENTS

| DE | 10327140 A1 | 1/2005 |
|---|---|---|
| DE | 102010036926 A1 | 2/2012 |

(Continued)

OTHER PUBLICATIONS

Figzerald et al, Electric Machinery, McGrall-Hill, fith Ed., 1990.*

(Continued)

*Primary Examiner* — John K Kim
(74) *Attorney, Agent, or Firm* — Berkeley Law & Technology Group, LLP

(57) ABSTRACT

An electric motor is disclosed having a detachable stator tooth. In some implementations, coil windings of the electric motor may be coupled to one or more drivers independently of other coil windings. A method of repairing and manufacturing an electric motor having a detachable stator tooth is also disclosed.

12 Claims, 6 Drawing Sheets

(56) References Cited

U.S. PATENT DOCUMENTS

| | | | | | |
|---|---|---|---|---|---|
| 5,821,723 | A | * | 10/1998 | Kim | ........................ H02P 25/08 318/701 |
| 5,945,801 | A | * | 8/1999 | Yamada | .................. H02P 25/08 318/400.27 |
| 6,566,839 | B2 | * | 5/2003 | DaSilva | ..................... H02P 8/14 310/68 R |
| 8,450,954 | B2 | | 5/2013 | Pietromonaco | |
| 9,065,304 | B2 | * | 6/2015 | Boughtwood | .......... B60L 50/52 |
| 9,130,433 | B2 | | 9/2015 | Pietromonaco | |
| 9,214,837 | B2 | | 12/2015 | Pietromonaco | |
| 2006/0071574 | A1 | * | 4/2006 | Stewart | ................... H02K 1/146 310/216.132 |
| 2010/0117477 | A1 | * | 5/2010 | Yoshino | ................. H02K 1/276 310/156.53 |
| 2010/0123426 | A1 | * | 5/2010 | Nashiki | .................... H02K 1/12 318/701 |
| 2010/0141080 | A1 | * | 6/2010 | Tang | ...................... H02K 1/165 310/216.111 |
| 2011/0284300 | A1 | * | 11/2011 | Cheng | ..................... H02P 25/08 180/65.51 |
| 2012/0169267 | A1 | * | 7/2012 | Nashiki | ................ H02K 19/103 318/701 |
| 2013/0119816 | A1 | * | 5/2013 | Yang | ...................... H02K 1/148 310/216.007 |
| 2014/0035490 | A1 | * | 2/2014 | Ramu | ..................... H02K 1/14 318/254.1 |
| 2014/0210285 | A1 | * | 7/2014 | Fahimi | ................... H02K 19/06 310/46 |
| 2015/0188372 | A1 | * | 7/2015 | Yokota | ..................... H02K 3/34 310/43 |
| 2015/0326100 | A1 | | 11/2015 | Pietromonaco | |
| 2015/0372631 | A1 | * | 12/2015 | Fedigan | ............... H02H 7/0822 318/490 |
| 2016/0065041 | A1 | | 3/2016 | Pietromonaco | |
| 2016/0079889 | A1 | | 3/2016 | Pietromonaco | |
| 2016/0079893 | A1 | | 3/2016 | Pietromonaco | |
| 2016/0315576 | A1 | * | 10/2016 | Fedigan | ............... H02H 7/0822 |
| 2017/0338723 | A1 | * | 11/2017 | Pietromonaco | .......... H02K 1/08 |

FOREIGN PATENT DOCUMENTS

| | | |
|---|---|---|
| FR | 3024300 A1 | 1/2016 |
| GB | 2526253 A | 11/2015 |

OTHER PUBLICATIONS

Ahn, "Switched Reluctance Motor", www.intechopen.com, Feb. 10, 2011.*
Database WPI Week 201429, Thomas Scientific, London, GB; An 2014-H33810 XP002772855, & CN 103 618 392 A (Shenzhen Inst Advanced Technology) Mar. 5, 2014, abstract, 2 pgs.
Notification of Transmittal of the International Search Report and The Written Opinion of the International Searching Authority, or the Declaration, International Application No. PCT/GB2017/051384, dated Aug. 21, 2017, 1 pg.
The International Search Report, International Application No. PCT/GB2017/051384, dated Aug. 21, 2017, 6 pgs.
The Written Opinion of the International Searching Authority, International Application No. PCT/GB2017/051384, dated Aug. 21, 2017, 10 pgs.

* cited by examiner

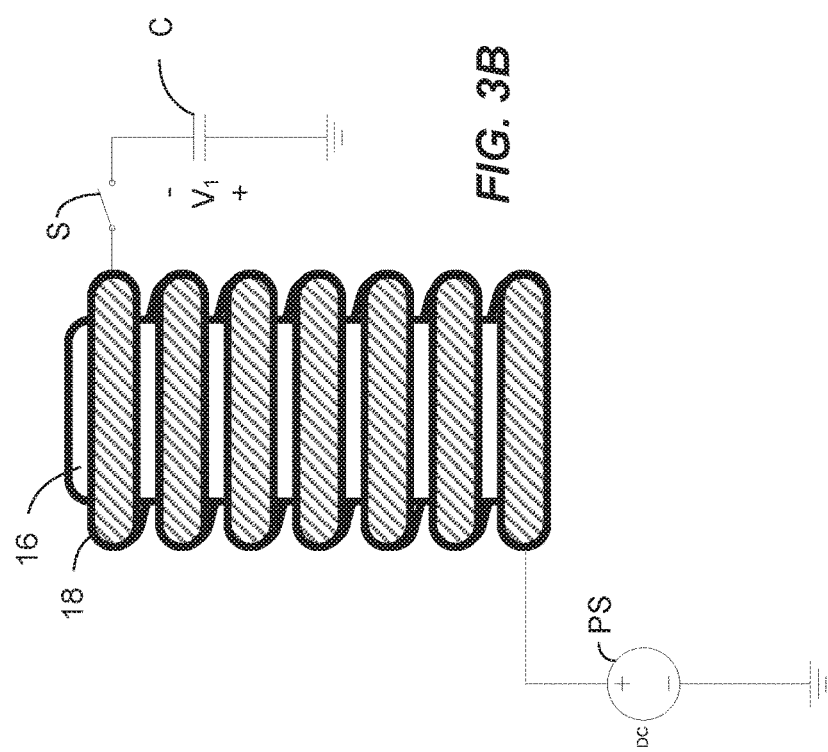
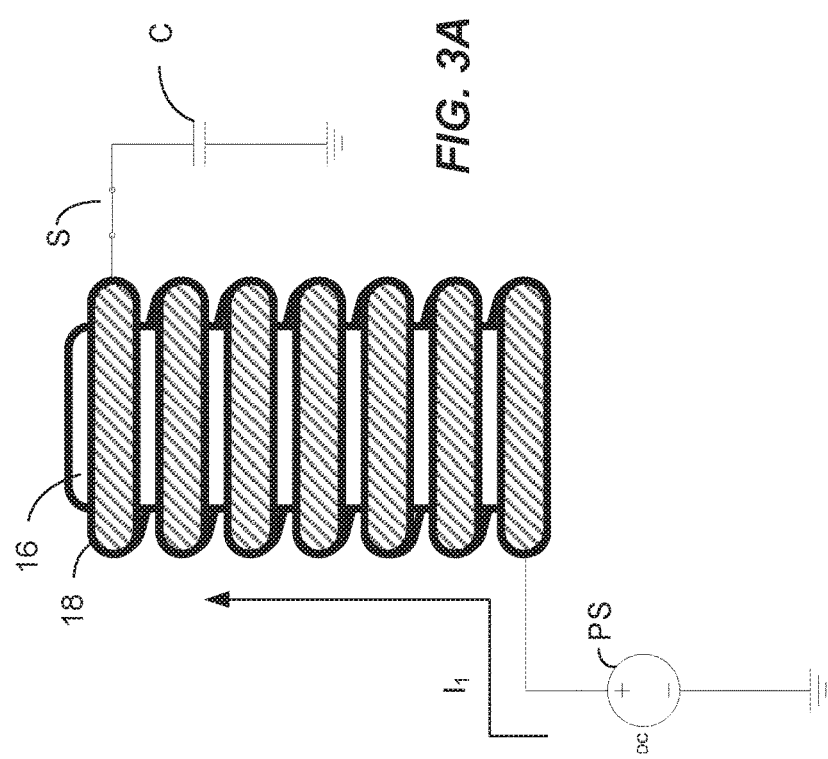
FIG. 3A
FIG. 3B

METHOD AND APPARATUS FOR MAINTENANCE OF ELECTRIC MOTOR

FIELD

This disclosure relates to electric motors.

INFORMATION

In certain types of situations, accessing portions of an electric motor, such as for repairing and/or servicing the electric motor, may be complex, difficult, inconvenient, and/or expensive, among other things. By way of non-limiting example, repairing an electric motor of an air conditioning unit, battery powered device (e.g., hand-held vacuum, drone, etc.), vehicle (e.g., train, car, etc.), generator (wind turbine, hydro-electric generator, etc.), among other things, may be difficult and/or inconvenient for certain conventional electric motors. There may be a desire, therefore, for an electric motor for which service and/or repair may be performed with comparative ease, such as in the field and/or without removing the electric motor for repair at a servicing, maintenance, and/or repair facility.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIGS. 3A-3C show a sample stator tooth and coil winding according to an embodiment;

Figure 1:
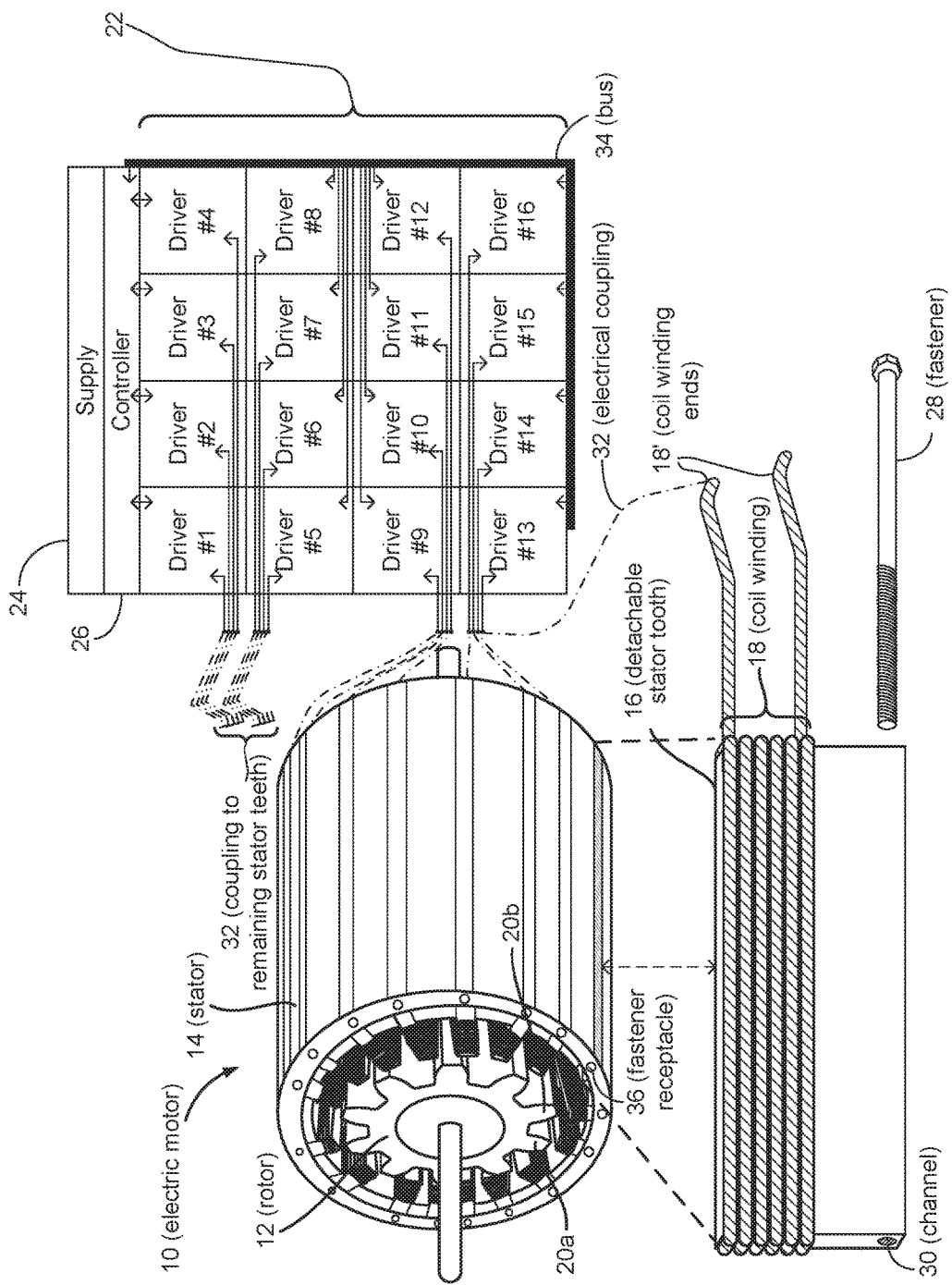
FIG. 1 is an illustration of an embodiment of an electric motor having a detachable stator tooth.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Electric motors typically include a rotor and a stator. The rotor may rotate relative to the stator responsive to one or more electric field interactions, such as between a rotor and a stator tooth. Rotor and stator teeth refer to portions of a rotor or stator that protrude from the rotor or stator, respectively. For example, an electromagnetic force, such as an attractive or repulsive force, between a tooth of a stator and a tooth of a rotor may bring about rotation of the rotor. In some cases, transmission of current through a coil winding wound about a tooth of a stator may generate an electromagnetic force, which may engender rotation of a rotor relative to a stator. Rotation of the rotor may provide a torque on a shaft of the electric motor, by way of example.

There may be a desire for electric motors to operate efficiently. As referred to herein, efficiency of an electric motor refers to a ratio of power output from the electric motor, such as in the form of torque provided by a rotor to a shaft, to power input to the electric motor, such as in the form of one or more electric pulses. In one implementation, to achieve desired efficiency, stator teeth may be arranged relative rotor teeth for desired magnetic field interaction. In some cases, a strength of electromagnetic interaction between stator and rotor teeth may be related to a distance separating rotor and stator teeth. As used herein, a distance separating aligned stator and rotor teeth is referred to as an air gap. The closer the aligned rotor and stator teeth, the stronger the electromagnetic force may be. For instance, in some conventional electric motor examples, the air gap separating aligned stator and rotor teeth may be approximately a tenth of 1.0 mm or less, such as for efficiency. In contrast, less efficient conventional electric motor examples may have an air gap of 1.0 mm or more, by way of illustrative example.

However, achieving efficient operation of electric motors, such as by way of a small air gap, may add complexity and/or cost to manufacturing, operation, and/or repair of an electric motor. For example, manufacturing electric motors with small tolerances may be complicated and/or expensive. Electric motors with small tolerances, such as with small air gaps, may also be less robust and/or may be ill-suited for harsh environments, such as those that may introduce factors that could cause the electric motor to break or not function properly (e.g., sandy environments, such as the desert). Heat dissipation may also be a concern for electric motors with small tolerances. Furthermore, the complexity of electric motors with small tolerances may be such that cost of the motor may become prohibitive. There may be a desire, therefore, for an electric motor that may operate efficiently without the small tolerances of some conventional electric motors.

Additionally, the supporting electric and mechanical parts of an electric motor, such as controllers, drivers, transmissions, and/or gearing, among other things, may add to cost and/or complexity for the motor. For example, in some cases, due at least partly to cost and complexity of driver circuits for an electric motor, one or more coil windings of stator teeth may be electrically coupled together. As such, transmission of energy to desired coil windings may be coordinated in some cases. Multiple coil windings coupled together may, in some cases, reduce cost and/or complexity of expensive driver circuits, among other things.

However, coupling multiple coil windings together may also render servicing an electric motor, such as, for example, a coil winding of the electric motor, complicated and/or expensive. For instance, in some cases in which multiple coil windings are electrically coupled together to a driver circuit, replacement of a single defective coil winding may not be possible without also electrically decoupling the defective coil winding from other coil windings. Furthermore, in some electric motor implementations, coil windings on one stator tooth may be in such close proximity to coil windings of an adjacent stator tooth that it may be difficult to remove a coil winding without also removing an adjacent coil winding, for example. Small air gaps and close proximity of coil windings are two sample ways in which small tolerances of electric motors may, in some instances, render maintenance and/or repair of a defective coil winding of an individual stator tooth of an electric motor complicated. With added complexity, in some cases, technicians may not be able to perform maintenance on portions of an electric motor in the field. Instead, maintenance may need to be performed in a maintenance facility, which may call for, among other things, removal and transportation of the electric motor from its housing and/or device (e.g., vehicle, air conditioning unit, etc.).

Additionally, some conventional electric motors may wrap coil windings about more than one stator tooth, referred to herein as a form of distributed winding. In one example of distributed winding, a first coil winding may be wrapped about more than one stator tooth, a second coil winding may be wrapped about more than one stator tooth, and the first and second coil windings may be wrapped, at least in part, about a same stator tooth. In some cases, use of distributed winding may be desirable when dealing with alternating current sine waves. However, as should be apparent, removing a first coil winding from a stator tooth may be rendered more complicated by a second (or more) coil winding also wrapped about the same stator tooth.

Figure 6:
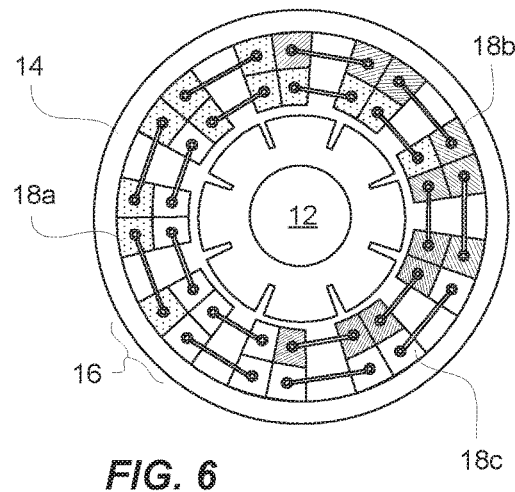
FIG. 6 is an illustration of a stator and rotor according to an embodiment.

FIG. 6 illustrates an example distributed winding rotor and stator embodiment. Stator 14 may comprise a plurality of stator teeth 16, of which an example stator tooth 16 is indicated. As illustrated, more than one coil winding may be arranged about a stator tooth 16. Coil winding 18a, indicated with a dot fill pattern, refers to a first coil winding that is wrapped, at least in part, about six different stator teeth 16. Coil winding 18b, indicated with diagonal lines, refers to a second coil winding that is also wrapped, at least in part, about six different stator teeth 16. And coil winding 18c, indicated with a solid white fill, refers to a third coil winding that is also wrapped, at least in part, about six different stator teeth 16. Thus, in the embodiment illustrated in FIG. 6, each stator tooth 16 is wrapped, at least in part, with more than one coil winding 18a, 18b, or 18c. As should be apparent, removing a stator tooth and/or stator coil in this arrangement may be complex and may call for substantial removal of coil windings 18a, 18b, and 18c. It may be desirable, therefore, to have coil windings arranged to enable repair and/or service of an electric motor.

To facilitate detachment of a stator tooth, in one embodiment, a given coil winding may be wrapped about at most one tooth, referred to herein as non-overlapping coil windings. For instance, in some cases, it may be less complicated to decouple a first stator tooth 16 if a coil winding 18 of first stator tooth 16 is not also wrapped about a second stator tooth 16.

Servicing an electric motor at a maintenance facility may lead to additional cost and/or inconvenience. The non-limiting example of an electric motor of an industrial air conditioning unit is offered by way of illustration. For instance, to repair such an air conditioning unit, heavy equipment, such as a crane, may be needed to remove the electric motor from the roof upon which the air conditioning unit is installed. Rooftop air conditioning unit removal may not only be costly, but it may also cause inconvenience, such as, by way of example, downtime, closing portions of grounds of a building (e.g., a parking lot), etc. Therefore, there may also be a desire for an electric motor that may be serviceable with less complexity and/or cost. For example, it may be desirable to have an electric motor that may be serviceable without having to transport the electric motor to a maintenance facility; instead performing repairs in the field, by way of example. By way of non-limiting example, it may be desirable to have an electric motor of a rooftop air conditioning unit that may be serviceable by a technician without having to remove the electric motor from the roof. By way of further non-limiting example, it may be desirable to have an electric motor of an electric vehicle that may be serviceable by a technician on the side of the road.

FIG. 1 illustrates an electric motor that may be serviceable with comparative ease, such as without having to remove an electric motor from a device and/or transport it to a maintenance facility. Thus, according to one embodiment, it may be possible to repair a portion of an electric motor in the field. An example electric motor 10 may comprise a rotor 12 and a stator 14. Rotor 12 may comprise a plurality of rotor teeth, of which rotor teeth 20a and 20b are indicated by way of illustration in FIG. 1. Stator tooth 16 represents an example stator tooth that has been removed from stator 14 as illustrated by the broken lines and arrows between the cavity in stator 14 and stator tooth 16. While only one stator tooth 16 and two rotor teeth 20a and 20b are labeled, it is to be understood that this is merely for the readability of FIG. 1. Example stator tooth 16 is magnified and shown below stator 14. As operation of stator tooth 16, coil winding 18, and/or electric motor 10 is described, it should be understood that the numerical identifiers for stator teeth, rotor teeth, and coil windings may apply to any one or more relevant stator teeth and/or coil windings consistent with the context of the description.

Figure 7A:
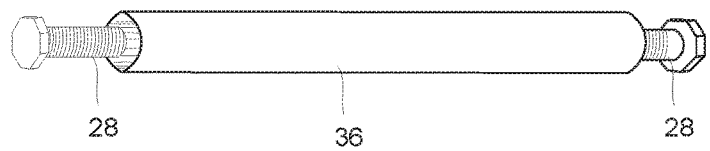
FIGS. 7A-7C illustrate alternative embodiments for fastening stator teeth to a stator.
Figure 7B:
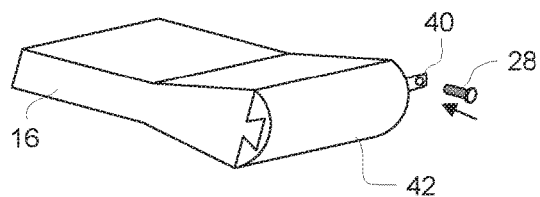
Figure 7C:
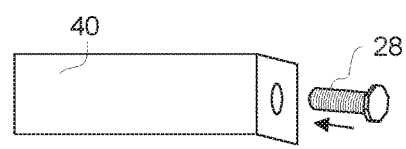

In one embodiment, stator tooth 16 may be detachable and/or may be secured to stator 14 using a fastener 28. Fastener 28 refers to any appropriate mechanism for securing or otherwise attaching stator tooth 16 to stator 14. For example, in one implementation, fastener 28 may comprise a bolt and/or a nut and may traverse one or more fastener receptacles 36 of stator 14 and channel 30 of stator tooth 16. In an alternative embodiment, rather than traversing stator tooth 16, one or more fasteners 28 may secure one or more ends of stator tooth 16 to stator 14. For example, a fastening mechanism may attach to one or more extremities of stator tooth 16, such as without having to traverse stator tooth 16. Removing a long fastener may be undesirable in certain circumstances, for example, and thus one or more smaller fasteners may be more suitable, such as if space is limited. FIG. 7A illustrates a fastener embodiment with one or more smaller fasteners 28. In one example, a spacer or receptacle 36 may be coupled to a stator tooth 16 to enable one or more fasteners 28 to attach stator tooth 16 to stator 14. In another example detachable stator tooth 16, stator tooth 16 may comprise one or more tabs or clips that may be secured to stator 14. For example, FIGS. 7B and 7C show two example tabs 40 that may be usable to couple stator tooth 16 to stator 14. FIG. 7B shows tab 40 with an opening such that fastener 28 may be inserted through the fastener in a direction substantially perpendicular to tab 40. In an alternative embodiment, tab 40 may be arranged such that fastener 28 is to be inserted in a direction substantially parallel to tab 40. While FIG. 7B only shows one tab 40, it is to be understood that in some implementations, one or more additional tabs 40 may also be arranged on stator tooth 16, such as for coupling to stator 14. Alternatively, in one embodiment, stator tooth 16 may be coupled to stator 14 by a tab 40 at one extremity and a different fastening mechanism, such as one or more of fasteners 28 in FIG. 7A, at a different extremity. Such an embodiment may be desirable in cases in which, for example, one or more fasteners 28 of electric motor 10 are readily accessible at only one end, and/or may not be readily accessible based, for instance, on fastener orientation and/or fastener obstruction (e.g., a fastener 28 substantially parallel with a spine or structural member of stator tooth 16 may not be readily accessible if arranged adjacent to, and thus obscured by, some other structure, etc.). In some cases in which a fastener does not traverse a length of stator tooth 16, it may be desirable to provide additional structural reinforcement to stator tooth 16, such as by way of a rigid structural member. In one example, a spine-like structural member may run through stator tooth 16 and may be, in at least some cases, be usable to secure via one or more fasteners. FIG. 7B shows an example stator tooth 16 having a structural member 42 that may, among other things, serve to reinforce stator tooth 16. In any case, an appropriate fastener may make it possible to service a coil winding and/or a stator tooth such as by coupling and removing a detachable stator tooth 16.

In an implementation of a stator 14 with detachable stator teeth 16, defective and/or malfunctioning coil winding 18 and/or stator tooth 16 may be removed from stator 14, such as by removing fastener 28 and stator tooth 16 from stator 14. Removal of detachable stator tooth 16 may comprise detaching a coil winding 18 from a driver of drivers 22. A replacement stator tooth may be inserted into a position freed by removal of the defective stator tooth 16 and a coil winding of the replacement stator tooth may be coupled to a driver of drivers 22. To secure new stator tooth 16 into place, fastener 28 may be inserted into fastener receptacle 36 and channel 30. As should be apparent, the ability to detach a stator tooth 16 from stator 14 may reduce complexity of repair and/or maintenance of electric motors.

Repair and/or maintenance of an electric motor may also be rendered less complex by being able to remove a coil winding from a driver independently of any other coil windings of the electric motor. As mentioned above, some conventional electric motors may have one or more coil windings that may be electrically coupled together and/or may overlap such as part of a distributed winding arrangement. For example, in one embodiment, a plurality of coil windings of a conventional stator 14 may be electrically coupled to a same driver or controller, such as via a common bus, by way of non-limiting example. In contrast, however, the present description proposes an example electric motor comprising coil windings 18 about stator teeth 16 that are coupled to one or more controllers 26 and/or drivers 22 independently of other coil windings 18 about other stator teeth 16. Further, the present description also proposes an example electric motor comprising non-overlapping coil windings. As such, in one implementation, a coil winding 18 of a first tooth may be removed from controller 26 and/or one or more drivers of drivers 22 without necessarily interfering with a coupling between a second coil winding 18 and a controller 26 and/or one or more drivers of drivers 22.

Thus in contrast to certain conventional electric motors, the present disclosure proposes an embodiment wherein multiple coil windings 18 may be coupled independently of one another to relevant control circuitry, such as drivers 22, controller 26, and/or supply 24. The embodiment illustrated in FIG. 1 uses a dash-dot line pattern between coil winding 18 and a driver of drivers 22 to indicate an electric coupling 32. Thus, by way of example, in one implementation, coil winding ends 18' may be electrically coupled to driver #13 of drivers 22, such as to enable transmission and/or reception of electrical signals between driver #13 and coil winding 18, via an electrical coupling 32. In one case, for instance, coil windings may be electrically coupled to drivers 22 such that there may be a one-to-one coupling arrangement of coil windings to drivers (e.g., first coil winding coupled to driver #1, second coil winding coupled to driver #2, etc.). Further, drivers 22, such as driver #13, may be electrically coupled to controller 26 via a bus 34 to enable transmission of electrical signals between drivers 22 and controller 26. Supply 24 may also be electrically coupled via drivers 22 and/or controller 26 to one or more coil windings 18. Of course, in other embodiments, supply 24 may be coupled directly to drivers 22 or to coil windings 18.

By coupling a first coil winding 18 to a relevant driver (e.g., driver #13) of drivers 22 independently of other coil windings 18, it may be possible to remove the first coil winding 18, such as for servicing, without necessarily decoupling one or more other coil windings 18 from a corresponding driver (e.g., driver #14) of drivers 22. An electric motor with a non-overlapping coil winding arrangement also makes possible removal of a first coil winding 18 without necessarily unwinding one or more other coil windings. As should be apparent, independently coupled and/or non-overlapping coil windings 18 may render maintenance and/or repair of an electric motor 10 less complex such that, among other things, it may be possible to service electric motor 10 in the field.

It is noted that coil windings that are coupled independently of other coil windings, such as to at least one driver of a plurality of drivers, may be arranged to allow transmission and/or reception of signals between portions of an electric motor 10 (e.g., drivers, controllers, power sources, coil windings, etc.). As illustrated by the embodiment of FIG. 1, drivers #1-#16 of drivers 22 may be arranged (e.g., electrically coupled) between a coil winding 18 of a stator tooth 16 and a controller 26. Bus 34 refers to a mechanism suitable to enable a transmission and/or reception of signals between drivers 22, controller 26, and/or supply 24. Thus, in one embodiment, signals may be transmitted from and/or received by supply 24 via a driver of drivers 22 to a coil winding 18 of electric motor 10. Of course, an embodiment is also contemplated in which signals may be transmitted from and/or received by supply 24 directly to a driver and/or a coil winding 18 of a stator tooth 16. In any case, transmission of current pulses to coil windings, such as coil winding 18, may generate an electromagnetic force which may engender rotation of rotor 12.

While the drivers may be formed on separate devices, in some cases it may be desirable to form multiple drivers (e.g., drivers 22) on a single device. For example, multiple drivers 22 may be formed in a single device using any one of several suitable CMOS processing technologies, for example. In other implementations, multiple drivers may be formed along with a processor (e.g., digital controller or microprocessor core) on a single device (e.g., as a system on a chip). Such a processor may provide signals to control the opening and closing of switches for multiple drivers controlling coil windings for multiple stator teeth of a motor. In a particular implementation, such a single device integrating a processor and multiple drivers may comprise a package with multiple external terminals (e.g., a ball grid array package) mountable to a printed circuit board. For example, the external terminals of the package may be coupled to charge storage devices (e.g., capacitors), one or more windings of respective stator teeth and a power supply 24 that are integrated with a motor. Of course, other embodiments are contemplated by the present description, such as, for example, drivers capable of coupling to a plurality of coil winding sets. The coil winding sets may be electrically coupled in series or parallel, such as to accommodate larger and/or fewer drivers, etc., such as according to design constraints.

In the course of its operational life, an electric motor may be serviced and/or repaired, for any number of reasons. By way of example, supporting circuitry, such as a driver, controller, power supply, etc., may be replaced. By way of further example, in some cases, a defective coil winding or a stator tooth may be replaced. In some implementations of an electric motor 10 with detachable stator teeth 16, it may be possible to service or repair electric motor 10 with less difficulty than some traditional electric motors with stator teeth that are not detachable. In some cases, service or repair of some large and/or heavy electric motors may include removal of large and heavy stator/rotor units. Due, at least in part, to coil windings that may not be independently coupled to a driver circuit, by way of example, servicing traditional electric motors may be a complex or challenging task. Complexity may also be due at least partly to small tolerances, such as smaller air gaps between aligned rotor and stator teeth and/or coil windings that may not allow extraction of a stator tooth without first unwrapping coil windings of adjacent stator teeth, by way of example. An additional factor potentially adding to repair and/or maintenance complexity may include distributed winding arrangements, for example.

For instance, as mentioned above, repair of industrial air conditioning units arranged on a roof may be performed using large equipment, such as a crane, to remove the electric motor for service or repair. However, by using an electric motor 10 with detachable stator teeth (e.g., stator tooth 16) and/or independent coil windings 18, certain example electric motors may be serviced in the field by a technician. Service in the field may comprise detaching a detachable stator tooth (e.g., stator tooth 16), and/or detaching a detachable coil winding (e.g., coil winding 18) that is independent of other coil windings of electric motor 10, without transporting electric motor 10 to a facility for repairs or maintenance, for example. In some cases, a defective stator tooth 16 and/or coil winding 18 may be removed from electric motor 10, replaced with a new stator tooth 16 and/or coil winding 18, and the defective stator tooth 16 and/or coil winding 18 may be sent for refurbishing.

Processes and methods for manufacturing electric motors with detachable stator teeth and/or coil windings may differ from the processes and methods of manufacturing traditional electric motors. Manufacturing an electric motor 10 with one or more detachable stator teeth 16, may comprise forming stator 14 separately from the one or more detachable stator teeth 16. Further, a wire may be wound about the one or more detachable stator teeth 16 to form a coil winding 18 during the manufacturing process, such as prior to attaching the one or more detachable stator teeth 16 to stator 14, and may be wound in a non-overlapping arrangement. A first coil winding may be coupled to a driver of the electric motor independently of at least a second coil winding wound about a second detached stator tooth. As such, in certain implementations, replacement stator teeth 16 may be fabricated separately from a stator 14, and/or may be available as after-market products. Thus, detachable stator teeth 16 may be sold separately from electric motor 10, or may be included with electric motor 10 as replacement parts, by way of limiting example.

As shall be shown, detachable stator teeth and/or coil windings, such as stator tooth 16 and coil winding 18, may be enabled by certain technical features of example electric motor implementations. For example, an electric motor 10 with larger tolerances, such as having a larger air gap between stator and rotor teeth, may allow use of detachable stator teeth (e.g., stator tooth 16), by way of example. By way of further example, independently coupled coil windings 18 of an electric motor 10, may facilitate removal of one coil winding 18 from one or more controllers 26 and/or one or more of drivers 22 without interfering with an electric coupling between other coil windings 18 and the one or more controllers 26 and/or one or more other drivers of drivers 22.

Additionally, in some conventional electric motors, coil windings on adjacent stator teeth of some conventional electric motors may be in close proximity, such as being separated by small distances. The close proximity of stator teeth and/or coil windings may impede detaching a stator tooth from the stator. However, in contrast, some example implementations consistent with claimed subject matter propose having a sufficient distance separating coil windings 18 of adjacent stator teeth 16 to allow detaching and removing a stator tooth 16 in the field.

In contrast to some conventional electric motors with tight tolerances, such as in spacing of stator teeth and/or small air gaps separating aligned stator and rotor teeth, embodiments of claimed subject matter may make it possible for electric motors with larger tolerances to nevertheless offer efficient operation by recapturing and reusing energy. In one implementation, improvements to efficiency may be achieved based at least partly on a driver/coil winding arrangement that may be capable of recapturing charge that has traversed a coil winding.

Figure 3C:
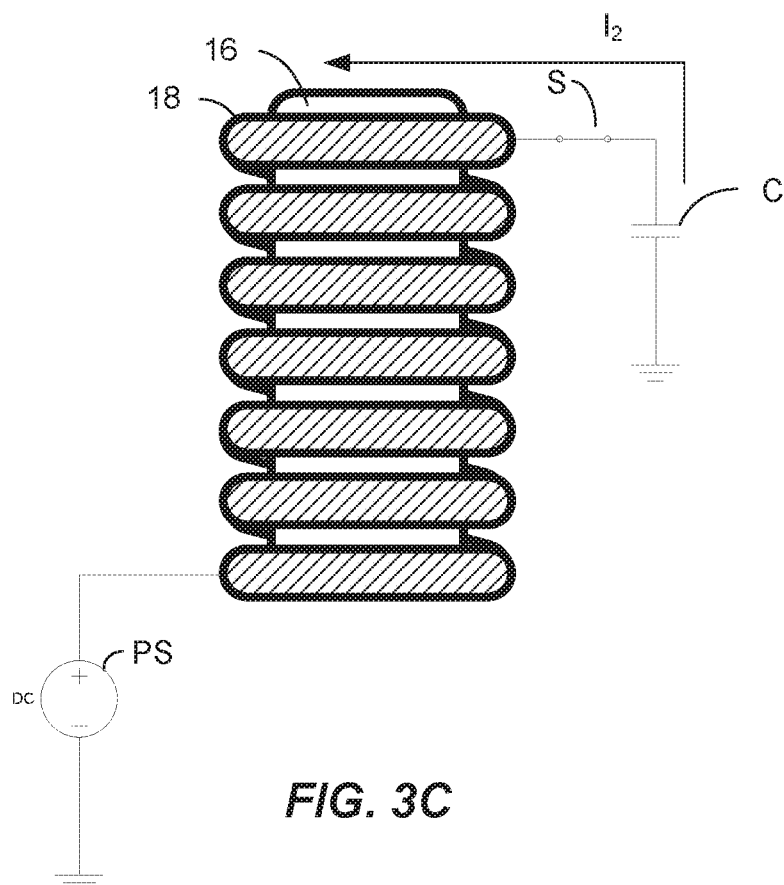

One such implementation is illustrated in FIGS. 3A-3C, and comprises a simplified arrangement of parts of an electric motor, such as electric motor 10 of FIG. 1. The example arrangement in FIG. 3A may be capable of driving a current $I_1$ from a power source PS through a coil winding 18. Changes in current, such as $I_1$, through coil winding 18 may induce an electromagnetic force. If a switch S is closed, as shown in FIG. 3A, current $I_1$ may drive charge into a charge storage device C. Charge storage device C represents a device, such as a capacitor, capable of holding a charge. In one embodiment, charge stored in charge storage device C may be transmitted back through coil winding 18, such as in a subsequent motor cycle.

Switches usable in drivers 22 may operate as conducting elements, such as FETs, to permit current to pass between source and drain terminals based, at least in part, on a voltage applied to a gate terminal. It should be understood, however, that other types of devices such as a bipolar transistor, thyristor, diode, variable resistor, etc. may be used as a conducting element, and that claimed subject matter is not limited in this respect. In this context, a switch may comprise a conducting element having first and second terminals that may form a connection between the first and second terminals by providing a conductive path between the first and second terminals having a very small or negligible impedance for a particular signal. In one particular example implementation, a conductive element may vary in impedance between the first and second terminals based, at least in part, on a signal provided to a third terminal of the conductive element (e.g., based on a voltage or current applied to a third terminal). In one aspect, a conductive element may "close" to thereby connect first and second terminals in response to a signal provided on the third terminal. Likewise, a conductive element may "open" to thereby disconnect first and second terminals in response to a different signal provided on the third terminal. In one aspect, a conductive element in an open state may isolate a first portion of a circuit from a second portion of the circuit by removing or disrupting a conductive path between the first and second portions of the circuit. In another aspect, a conducting element may vary an impedance between first and second terminals between opened and closed states based on a signal provided to a third terminal.

FIG. 3B illustrates a voltage $V_1$ across terminals of charge storage device C. Voltage $V_1$ may reflect charge, such as from current $I_1$, stored in charge storage device C. While in some embodiments a charge storage device C, such as a capacitor, may attempt to discharge or transfer stored charge back into the circuit, opening switch S may serve to hold stored charge in charge storage device C. Thus, by opening switch S, charge, such as represented by $V_1$ across terminals of charge storage device C, may be held in charge storage device C. As such, it may be possible to achieve a desired efficiency by capturing charge, such as in charge storage device C, to be used in later cycles of an electric motor.

Further, as should be apparent, in one implementation it may be possible to control charge and discharge of charge storage device C, such as by opening and closing switch S. FIG. 3C illustrates charge being driven from the charge storage device through coil winding 18 in the form of $I_2$. In one embodiment, by closing switch S, charge may be driven back through coil winding 18, a second electromagnetic force may be generated on coil winding 18 which may engender rotation of a rotor. Thus, efficient operation of an electric motor, even, in some cases, an electric motor with larger tolerances, such as a larger air gap separating aligned rotor and stator teeth, may be achieved by capturing charge for use in subsequent cycles using a charge storage device and/or a switch, by way of non-limiting example.

In one embodiment, the charge making up $I_2$ may be driven back to power source PS. The charge may be captured, such as by storing the charge in a battery or other charge storage device, and reused, such as by adding it to a subsequent current pulse to be driven through coil winding 18.

TABLE 1

| | Charge in volts (V) | | |
|---|---|---|---|
| Time $t_i$ | PS | 18 | C |
| $t_0$ | $V_1$ | 0 V | 0 V |
| $t_1$ | 0 V | $V_1$ | 0 V |
| $t_2$ | 0 V | 0 V | $V_2$ |
| $t_3$ | 0 V | $V_2$ | 0 V |
| $t_4$ | $V_1 + V_3$ | 0 V | 0 V |

Table 1, above, illustrates operation of an example coil winding 18 and driver (e.g., a driver of drivers 22) comprising a switch S and a charge storage device C at variety of times $t_i$. It is noted that the column labeled PS refers to charge driven from a power source PS and not necessarily a total charge stored in a power source PS. Thus, power source PS may transmit discrete portions of charge that it stores to coil winding 18. At a first time $t_0$, charge may be driven from power source PS to coil winding 18, as illustrated in FIG. 3A. A first voltage $V_1$ may be generated across a terminal of power source PS and a terminal of coil winding 18 (e.g., a coil winding end 18', not shown in FIG. 3A), as shown in Table 1. At a second time $t_1$, the charge may be driven through coil winding 18, as shown by the first voltage $V_1$ across terminals (e.g., coil winding ends 18' of FIG. 1), as shown in Table 1. Driving charge through coil winding 18 may engender an electromagnetic field that may be capable of providing a torque on a rotor tooth (e.g., rotor tooth 20a or 20b in FIG. 1) in proximity to stator tooth 16.

Subsequent to time $t_1$, coil winding 18 may attempt to drive charge toward a charge storage device C, such as a capacitor, by way of non-limiting example. The charge driven from coil winding 18 may traverse switch S, which may be in a closed position, thus allowing charge to travel from one of its terminals to a second one of its terminals, and on to charge storage device C. It may be desirable to hold charge in charge storage device C, such as for timing, and thus switch S may be opened. As such, in one embodiment, charge stored in charge storage device C may be maintained until desired, such as to provide a torque on a rotor 14. FIG. 3B illustrates a third time, $t_3$, at which switch S is in an opened position and a voltage $V_2$ (e.g., where $V_2 \approx -V_1$, as charge may be lost during transmission from power source PS, via coil winding 18, to charge storage device C, among other things) may be measured across terminals of charge storage device C.

As illustrated in FIG. 3C, at a fourth time $t_3$, switch S may be placed in a closed position, thus allowing charge to be transmitted from charge storage device C, such as shown by $I_2$, back through coil winding 18. Thus, a voltage $V_2$ may be measured across coil winding 18. It may be desirable in some cases, to transfer the charge back into power source PS (e.g., a battery), such as for subsequent cycles or phases. As such, at a subsequent time, $t_4$, the charge received from charge storage device C may be combined with further charge to, as shown by $V_1+V_3$ in Table 1, for efficient operation.

It should be understood that two or more coil windings may be logically paired to engender electromagnetic field pulses at approximately a same time. Thus, at time $t_1$, as a first coil winding 18 generates a first electromagnetic force responsive to charge transmitted from a power source PS, a second coil winding 18 may generate a second electromagnetic force responsive to charge transmitted from a charge storage device C. Thus, the net power from power source PS used for the first and second electromagnetic forces from the power source PS is the power for the first electromagnetic force minus the power for the second electromagnetic force, based at least partly on charge from charge storage device, which may be transmitted back to power source PS. It should be understood that such operation may offer significant efficiency improvements over prior approaches.

Due at least partly to efficiency of recaptured charge, aluminum (Al) coil windings may be used instead of copper (Cu) coil windings in at least one embodiment. While Cu coil windings may tend to conduct charge more efficiently than Al coil windings, Al coil windings may weigh less than Cu coil windings. As such, by being able to recapture and reuse charge, potential inefficiencies in Al coil windings may be offset by efficient operation and lighter coil windings. For at least this additional reason, it may be desirable to recapture and reuse charge.

Figure 4A:
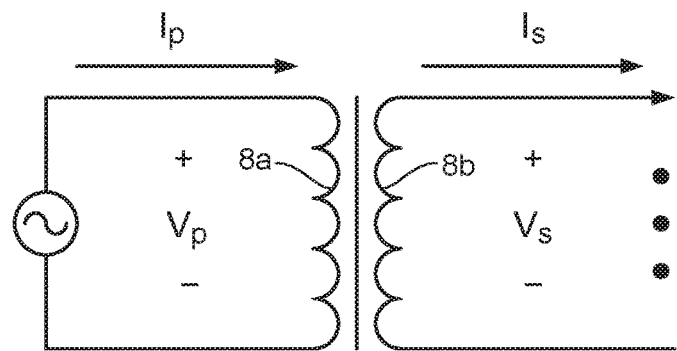
FIG. 4A is an illustration of an example transformer according to an embodiment.

As shown, then, in some cases it may be desirable to recapture energy transmitted through coil winding 18, as the recaptured energy may render electric motor 10 more efficient. However, rather than wrapping a single coil winding 18 about stator tooth 16, in one implementation, a plurality of coil windings may be used, such as is shown by first coil winding 18a and second coil winding 18b in FIG. 5. For example, there may be a desire for a relatively inexpensive and/or simple way of operating electric motors at low voltages. One approach may comprise transforming a low voltage, such as from a battery, to a higher voltage to drive an electric motor. FIG. 4A illustrates a simple transformer comprising a mutually inductive coil winding pair. As shown, an oscillator (e.g., an AC power source) may drive a current $I_p$ through a primary coil winding 8a. Of course, transformers operate consistently with the law of conservation of energy and Faraday's law of induction, such that a power on first mutually coupled coil winding 8a is equal to a power on second coil winding 8b of the mutually coupled inductive pair, represented as $P=I_pV_p=I_sV_s$. According to Faraday's law, there is a relationship between the number of turns of the coil winding and the induced voltage. As such, it may be possible to induce a desired voltage and/or current on second coil winding 8b by selecting an appropriate coil, such as with an appropriate number of turns. For example, Faraday's law of induction provides that a voltage for a wound coil may be represented as $$V = -N\frac{d\Phi}{dt},$$

where N refers to a number of turns of a coil winding and $d\varphi$ refers to a change in magnetic flux. In other words, a voltage on a coil winding may be proportional to a change in magnetic flux. Additionally, Lenz's law provides that changes in current on one coil winding of a mutually coupled coil winding pair, may be opposed by current induced on the other coil winding of the pair. Thus, changes in $I_p$ in primary coil winding 8a may induce an electromagnetic field. In response, an opposing electromagnetic field may be induced on secondary coil winding 8b, which may generate a current $I_s$, which is opposite in direction to that of $I_p$. And because, as noted, if second coil winding 8b comprises more coil turns than primary coil winding 8a, a step-up effect may be created wherein a lower voltage $V_p$ may generate a greater voltage $V_s$ on the secondary coil winding 8b. Furthermore, it may be desirable to, rather than using a separate transformer, enable the coils of an electric motor to act as a step up transformer.

According to an embodiment, a change in a current through a coil winding on a stator tooth may induce a magnetic force, creating a torque to drive a motor. In a particular implementation, a stator tooth may comprise two coil windings, a first coil winding to receive a signal from a power supply and a second coil winding to generate the magnetic force creating the torque. It may be desirable to enable yet further efficiency in electric motor operation by capturing and/or reusing the current generated on the second coil winding. In one embodiment, this may be achieved by allowing stored charge to oscillate through the second coil winding. Responsive to changes in current through the second current from oscillation of the stored charge, the second coil winding may induce a magnetic force to create the torque. For instance, the second coil winding may be arranged relative one or more charge storage devices (e.g., capacitors) to form a resonance circuit capable of maintaining an oscillating current to induce an electromagnetic field. In a particular implementation, one or more switches may be used in a driver circuit to, among other things, facilitate control of timing of oscillations of current through the second coil winding. In particular implementations, the first and second coil windings on the stator tooth form a mutually inductive pair such that the first coil winding may, in response to a power signal, generate a magnetic field inducing a current in the second coil winding. The driver circuit may synchronize the induced current in the second coil winding and add it to current in the second coil winding from the oscillating charge.

Figure 5:
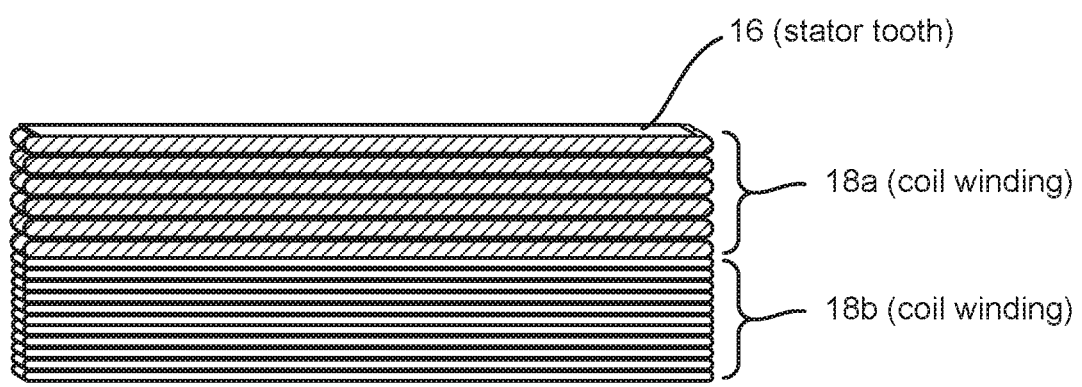
FIG. 5 is an illustration of a stator tooth with a split coil winding according to an embodiment.
Figure 4B:
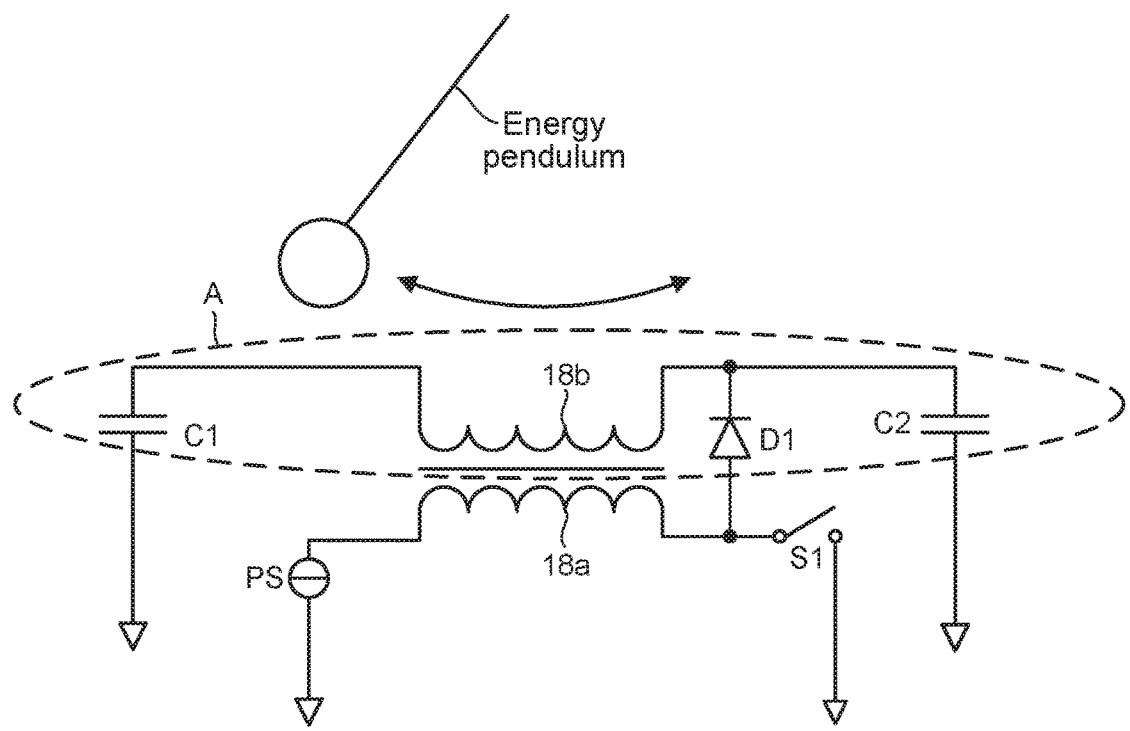
FIG. 4B is an illustration of a driver circuit coupled to two coil windings according to one embodiment.

In one embodiment, a first coil winding 18a and a second coil winding 18b may be wound about a stator tooth 16 as illustrated by FIG. 5. Stator tooth 16 of FIG. 5 may comprise a detachable stator tooth. FIG. 4B illustrates a resonance circuit embodiment to demonstrate particular operation of particular features of first and second coil windings 18a and 18b according to an embodiment of stator tooth 16 and a simple driver circuit, such as may be used to apply torque to a rotor. A magnetic force may be induced responsive to changes in current through second coil winding 18b. The induced magnetic force may apply a torque to one or more rotor teeth (e.g., rotor tooth 20a or 20b in FIG. 1). Additionally, energy that is not used or lost in inducing the magnetic field may be captured in a charge storage device, such as a capacitor. Charge storage devices C1 and C2 represent devices, such as capacitors, capable of storing and discharging a charge. Therefore, the top portion A (shown with dotted line) of FIG. 4B may be capable of acting as an energy pendulum in which charge may be stored in C1 or C2, alternatively. While charge is in transit through second coil winding 18b, a change in current through second coil winding 18b may induce an electromagnetic force, applying a torque to one or more rotor teeth.

While energy in the resonance circuit may be converted to work or lost as charge oscillates between C1 and C2, the lower portion of FIG. 4B may be capable of introducing additional energy as current into second coil winding 18b. In one embodiment, a ratio of turns about stator tooth 16 of first coil winding 18a to turns about stator tooth 16 of second coil winding 18b may be selected to achieve a step-up transformer effect. For instance, acceptable ratios may include, but are not limited to, 1:2, 1:3, 1:5, and 1:10. Thus, an electric and magnetic field (EMF) responsive to changing current in first coil winding 18a may generate a desired current in second coil winding 18b that may be added to current between charge storage devices C1 and C2. For instance, in one embodiment, second coil winding 18b may have 10× more turns than first coil winding 18a, such as to enable an increased voltage on second coil winding 18b. Of course, any other appropriate ratio may be selected according to desired operation and operational parameters (e.g., input voltage, desired output voltage, etc.), and claimed subject matter is not limited in this respect.

TABLE 2

| | Charge in volts (V) | | |
|---|---|---|---|
| Time $t_i$ | $C_1$ | 18b | $C_2$ |
| $t_0$ | $V_1$ | 0 V | 0 V |
| $t_1$ | 0 V | $V_1$ | 0 V |
| $t_2$ | 0 V | 0 V | $V_2$ |
| $t_3$ | 0 V | $V_3$ | $V_2$ |

Table 2 illustrates charge location in the resonance circuit of FIG. 4B at a plurality of points in time, $t_i$. For simplicity, it is assumed that the resonance circuit is a simplified ideal circuit. Accordingly, in one embodiment, at a first time $t_0$, a first voltage $V_1$ may be stored in charge storage device C1. Charge storage device C1 may tend to equalize its voltage with that of charge storage device C2. Therefore, at a second time $t_1$, charge may be driven from charge storage device C1 through second coil winding 18b. Changes in current in second coil winding 18b may induce a magnetic force, applying a torque to a rotor. Once charged, however, second coil winding 18b may tend to discharge and drive charge back to charge storage devices C1 and/or C2. As such, at a third time, $t_2$, charge may be driven to charge storage device C2. Thus, a second voltage (e.g., $V_2$, where $V_1 \approx -V_2$) may be stored at charge storage device C2. At a fourth time, $t_3$, additional charge may be generated in second coil winding 18b. For instance, current may be affected in second coil winding 18b by driving a current from a power source PS (e.g., a battery) through first coil winding 18a. The current generated in second coil winding 18b (e.g., corresponding to a voltage $V_3$ across terminals of second coil winding 18b) may then be added to or otherwise combined with the charge oscillating between charge storage devices C1 and C2 (e.g., referred to as an energy pendulum in FIG. 4B), such as to facilitate operation of an electric motor 10. The arrangement of PS, 18a, S1, C2 and D1 in FIG. 4B may form what may be referred to as a switched inductor boost circuit. As such, while current may be generated in second coil winding 18b responsive to an EMF, current in second coil winding 18b may also be based at least partly on current generated from the switched inductor boost circuit. Thus, in one implementation, diode D1 may serve to keep current from being generated in first coil winding 18a and diode D1 may also serve as part of the switched inductor boost circuit to transfer charge from the switched inductor boost circuit to the top portion A.

Figure 2B:
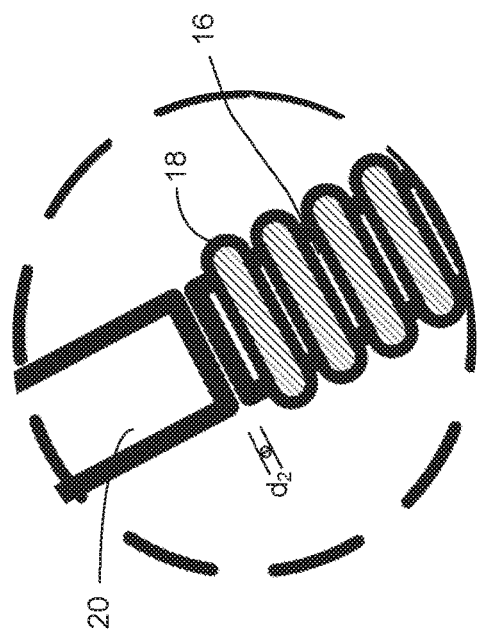
FIG. 2B is an illustration of a rotor and stator combination of an electric motor embodiment showing another sample air gap separating aligned stator and rotor teeth.

As discussed above, tolerances of an electric motor, such as an air gap separating aligned stator and rotor teeth, may render electric motor maintenance more complicated if such tolerances are small such as having a small air gap separating aligned motor and stator teeth. FIG. 2B illustrates an air gap of a distance $d_2$ separating an aligned rotor tooth 20 and stator tooth 16. As noted, generally, smaller air gaps separating rotor teeth 20 and stator teeth 18 may yield electric motors that operate more efficiently than electric motors with larger air gaps. Among other things, smaller air gaps may tend to yield stronger attractive or repulsive forces between rotor and stator teeth. However, smaller air gaps separating rotor and stator teeth may tend to yield more complex and/or expensive electric motors. As such, in at least some cases, efficiency comes at the cost of more expensive and/or complex electric motors.

It is noted, however, that by recapturing energy, such as was explained in reference to FIGS. 3A-3C and 4B, efficient operation of an electric motor 10 may be achieved even with comparatively larger air gaps separating rotor and stator teeth. Thus, it may be possible to achieve efficient operation of an electric motor without the complexity and/or cost of an electric motor with minimal air gaps separating rotor and stator teeth.

Thus, by way of illustration but not limitation, instead of having a 0.1 mm air gap, implementations of the present disclosure may have an air gap that is greater than or equal to approximately 0.5 mm. By way of example, in some cases, an air gap of approximately 1 mm or more may be suitably efficient. Further, in some implementations of electric motor 10, air gaps of approximately 2 to 3 mm may operate with sufficient efficiency due, at least in part, to energy recapture.

Figure 2C:
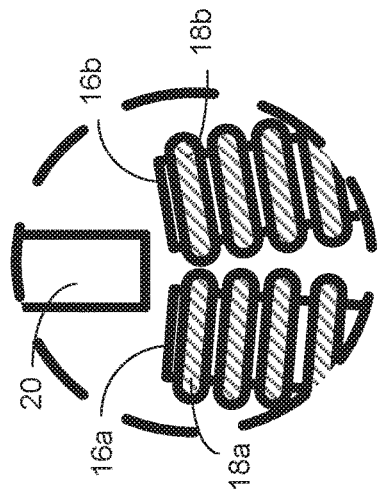
FIG. 2C is an illustration of sample stator and rotor teeth of an electric motor embodiment.
Figure 2A:
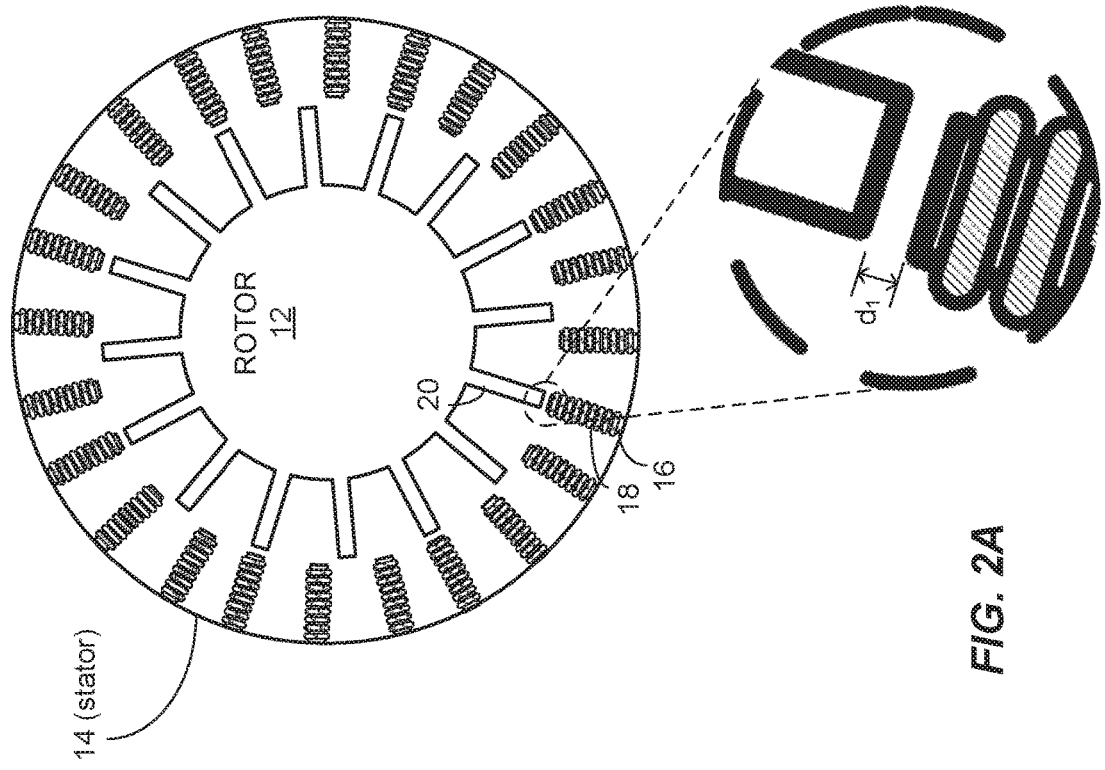
FIG. 2A is an illustration of a rotor and stator combination of an electric motor embodiment showing a sample air gap separating aligned stator and rotor teeth.

As discussed above, in one implementation of an electric motor 10, tolerances of electric motor 10, such as an air gap separating aligned rotor and stator teeth, may render a detachable stator tooth 16 feasible. FIG. 2A illustrates a rotor 12 and a stator 14 having a plurality of rotor teeth 20 and a plurality of stator teeth 16 about which at least one coil winding 18 is wrapped. The zoomed portion of FIG. 2A focuses on an air gap of distance $d_1$ separating rotor tooth 20 and stator tooth 16. In one embodiment, distance $d_1$ may comprise approximately 0.5 mm. As is apparent by comparing FIGS. 2A and 2B, $d_1$ is greater than $d_2$. Smaller air gaps, while potentially beneficial for efficiency, may render electric motor service, repair, and/or maintenance more difficult. As such, in some cases, maintenance of the electric motor in FIG. 2A may be rendered less complex than maintenance of the electric motor in FIG. 2B, such as by use of a detachable stator tooth 16 and/or in part due to a larger air gap $d_1$.

Additionally, in some conventional electric motor embodiments, the tolerances may be so small that the proximity of rotor and stator teeth may render removal of coil windings and/or stator teeth difficult. FIG. 2C shows one such conventional arrangement of rotor and stator teeth, such as rotor tooth 20 and stator teeth 16a and 16b, may have smaller tolerances such as a small air gap and coil windings 18a and 18b in close proximity. In some cases, due at least partially to close proximity between coil windings 18a and 18b, it may be difficult to remove a stator tooth, such as stator tooth 16b, without first removing coil winding 18b and/or 18a. This may render servicing the corresponding electric motor more difficult.

With the foregoing in mind, it should be apparent that in at least some cases electric motors with larger tolerances may be desirable. For instance, if air gaps separating rotor and stator teeth are larger, it may be possible to access coil winding 18 and/or a stator tooth 16, such as to detach coil winding 18 and/or stator tooth 16 from stator 14 for maintenance and/or repair, among other things. Thus, by recapturing energy, a larger air gap may be used, and it may be possible to use detachable stator teeth.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

CONCLUSION

In one embodiment, an apparatus includes a rotor having a plurality of rotor teeth; and a stator having a plurality of stator teeth. The one or more of the plurality of stator teeth are detachably coupleable to the stator.

In one implementation of the apparatus, at least one of the one or more of the plurality of stator teeth further comprises at least one coil winding.

In one implementation of the apparatus, at least one coil winding is detachably coupleable to a corresponding one of a plurality of divers independently of coil windings of other stator teeth of the plurality of stator teeth.

In one implementation of the apparatus, the at least one coil winding of a first one of the plurality of stator teeth is arranged relative the at least one coil winding of a second one of the plurality of stator teeth to enable detachment of the first one of the plurality of stator teeth, wherein the first one and the second one of the plurality of stator teeth are adjacent.

In one implementation of the apparatus, the corresponding one of the plurality of drivers comprises one or more charge storage devices for recapture of energy transmitted through the at least one coil winding.

In one implementation of the apparatus, the rotor and the stator are arranged for an air gap separating aligned stator and rotor teeth of approximately 1 mm or more.

In one implementation of the apparatus, the one or more of the plurality of stator teeth are detachably coupleable to the stator via one or more fasteners.

In one implementation of the apparatus, the at least one coil winding comprises Cu. In an alternative embodiment, the at least one coil winding comprises Al.

In one implementation of the apparatus, the apparatus also includes a controller electrically coupled to a plurality of drives, and wherein the plurality of drivers are configured for a one-to-one coupling with a plurality of detachably coupleable coil windings.

In one implementation of the apparatus, the one or more of the plurality of stator teeth comprise a channel for receiving a fastener to couple the one or more of the plurality of stator teeth to the stator.

In one implementation of the apparatus, the stator comprises at least one fastener receptacle for receiving the fastener.

In one implementation of the apparatus, the one or more of the plurality of stator teeth is detachably coupleable to the stator via at least one fastener at one or more ends of the one or more of the plurality of stator teeth.

In one implementation of the apparatus, the one or more of the plurality of stator teeth comprises a rigid structural member coupled to the at least one one fastener.

In one implementation of the apparatus, at least a first driver of the plurality of drivers comprises a charge storage device coupled to a switch for recapture of energy transmitted through at least one of the plurality of coil windings.

In one embodiment, a method of servicing an electric motor includes: detaching a stator tooth from a stator of the electric motor, the stator comprising a plurality of stator teeth, wherein the stator tooth is detached while maintaining at least one other stator tooth of the stator attached to the stator; and detaching one or more coil windings of the detached stator tooth from a corresponding driver circuit of one or more driver circuits of the electric motor while maintaining coil windings of the at least one other stator tooth of the plurality of stator teeth attached to the one or more driver circuits.

In one implementation of the method, the method also includes sending the detached stator tooth comprising the detached one or more coil windings for refurbishing.

In one implementation of the method, the method also includes attaching a new one or more coil windings to the corresponding driver circuit of the one or more driver circuits.

In one implementation of the method, the method also includes attaching a new stator tooth comprising the new one or more coil windings to the stator of the electric motor.

In one embodiment, method of manufacturing an electric motor includes: providing a plurality of stator teeth detached from a stator of the electric motor; winding at least one coil winding about a first detached stator tooth of the plurality of stator teeth; and coupling the at least one coil winding to a driver of the electric motor independently of at least a second coil winding wound about a second detached stator tooth.

In one implementation of the method, the method also includes attaching the detached stator teeth to the stator of the electric motor.

In one implementation of the method, the method also includes providing replacement stator teeth comprising at least one coil winding.

What is claimed is:

1. An apparatus comprising:
    a rotor to comprise a plurality of rotor teeth; and
    a stator to comprise a plurality of stator teeth, wherein at least one of the plurality of stator teeth further to comprise at least a first coil winding and a second coil winding;
    wherein one or more of the plurality of stator teeth to be individually detachably coupleable to at least a portion of the stator to enable replacement of an individual stator tooth of the one or more of the plurality of stator teeth,
    wherein the at least the first and second coil windings to be detachably coupleable to a corresponding one of a plurality of drivers independently of coil windings of other stator teeth of the plurality of stator teeth, the corresponding one of the plurality of drivers to comprise one or more charge storage devices to store energy, and
    wherein the second coil winding to be arranged to combine a first current from discharge of at least one of the one or more charge storage devices through the second coil winding and a second current to be generated in the second winding responsive to magnetic energy from the first coil winding.

2. The apparatus of claim 1, wherein at least one coil winding of a first one of the plurality of stator teeth to be arranged relative to at least one coil winding of a second one of the plurality of stator teeth to enable detachment of the first one of the plurality of stator teeth, wherein the first one of the plurality of stator teeth and the second one of the plurality of stator teeth to be adjacent.

3. The apparatus of claim 1, wherein the rotor and the stator to be arranged for an air gap separating aligned stator and rotor teeth of between approximately 0.5 mm and approximately 3 mm.

4. The apparatus of claim 1, wherein the one or more of the plurality of stator teeth to be detachably coupleable to at least the portion of the stator via one or more fasteners.

5. The apparatus of claim 1, wherein the at least the first coil winding and the second coil winding to comprise copper.

6. The apparatus of claim 1, wherein the at least the first coil winding and the second coil winding to comprise aluminum.

7. The apparatus of claim 1, further comprising a controller electrically coupled to a plurality of drivers, and wherein the plurality of drivers to be arranged for a one to-one-coupling with a plurality of detachably coupleable coil windings.

8. The apparatus of claim 1, wherein the one or more of the plurality of stator teeth to comprise a channel to receive one or more fasteners to couple the one or more of the plurality of stator teeth to the at least the portion of the stator.

9. The apparatus of claim 8, wherein the stator to comprise at least one fastener receptacle to receive at least one of the one or more fasteners.

10. The apparatus of claim 1, wherein the one or more of the plurality of stator teeth to be detachably coupleable to the at least the portion of the stator via one or more fasteners approximately at one or more ends of the one or more of the plurality of stator teeth.

11. The apparatus of claim 10, wherein the one or more of the plurality of stator teeth to comprise a rigid structural member coupled to the one or more fasteners.

12. The apparatus of claim 1, wherein the corresponding one of the plurality of drivers to comprise a switch to couple the at least one of the one or more charge storage devices to the second coil winding, the at least one of the one or more charge storage devices to recapture energy transmitted through the second coil winding.

* * * * *